United States Patent [19]

Takata et al.

[11] Patent Number: 4,871,610

[45] Date of Patent: Oct. 3, 1989

[54] EXTERIOR WATER-PROOF ORNAMENTAL SHEET AND METHOD OF CONSTRUCTION IT

[75] Inventors: Shigeru Takata; Takeki Aono; Gentaro Fujieda, all of Toyo, Japan

[73] Assignee: Fujiwara Chemical Co., Ltd., Ehime, Japan

[21] Appl. No.: 120,318

[22] Filed: Nov. 13, 1987

[30] Foreign Application Priority Data

Nov. 15, 1986 [JP] Japan ................................ 61-272646

[51] Int. Cl.[4] ................................................ B32B 7/00

[52] U.S. Cl. ................................ 428/246; 427/389.9; 427/393.4; 427/394; 428/251; 428/252; 428/253; 428/284; 428/285; 428/286; 428/287; 428/288

[58] Field of Search ............... 428/246, 251, 252, 253, 428/284, 285, 286, 287, 288; 427/389.9, 393.4, 394

[56] References Cited

U.S. PATENT DOCUMENTS 4,803,116 2/1989 Amano et al. ...................... 428/286

*Primary Examiner*—Marion C. McCamish
*Attorney, Agent, or Firm*—Koda and Androlia

[57] ABSTRACT

A method, in which a water-proof sheet prefabricated in the factory is bonded or stuck to an outer wall. This water-proof sheet is an exterior water-proof ornamental sheet according to the present invention, that is, a sheet comprising a fibrous sheet member, water-proof layer and ornamental layer laminated in this order, in which a part of the water-proof layer is formed by impregnating said fibrous sheet member with water-proof paints used for the formation of this water-proof layer. This sheet was stuck to the outer wall surface using adhesives or stuck to the outer wall surface through an adhesive water-proof rubber sheet to form an outer surface of the outer wall, whereby succeeding in the construction of a highly water-proof outer wall.

In addition, the improvement of weather-resistance and contamination-resistance could be attained by forming a top coat paint film layer formed of paints capable of improving such performances on the above described sheet like ornamental layer.

6 Claims, 1 Drawing Sheet

EXTERIOR WATER-PROOF ORNAMENTAL SHEET AND METHOD OF CONSTRUCTING IT

BACKGROUND OF THE INVENTION

1. Field of the Invention

The present invention relates to an exterior water-proof ornamental sheet suitable for forming a water-proof layer on a porous outer wall by sticking it to a surface of the porous outer wall, in particular to an exterior water-proof ornamental sheet comprising a water-proof layer formed of a sheet member obtained by coating and impregnating a fibrous sheet member having a specified unit quantity and permeability with a water-proof paint and an ornamental layer formed of an ornamental paint laminated and an exterior water-proof ornamental sheet more superior in weather-proofness and contamination-proofness obtained by laminating a specified top-coat paint layer as an outermost layer on said ornamental layer of the sheet surface as well as a method of bonding or sticking these sheets capable of exhibiting superior water-resisting and water-proof characteristics without producing any inter-layer separation between the sheet and the adhesive layer when the sheet is stuck to the porous outer wall and the like with adhesives and the like.

2. Prior Art

An outer wall formed of porous outer wall materials, such as woods and light weight concrete, has been widely used with making up the water-proofness by applying acrylic emulsion and the like on an outer surface while an advantage of light weight is utilized in spite of its disadvantage of poor water-proofness. In particular, recently light weight concrete has shown a remarkable growth in demand due to its insulating property, light weight and durability coupled with the standardization and mass-production by the prefabricated concrete construction.

In the conventional provision of a water-proofness by the application of paints to an outer wall, a spray painting has been chiefly used, so that problems have occurred in that a pollution due to the scattering of paint mists occurs; an aging of paints is necessary; an assembling operation of a scaffold costs labor; and the like. In addition, in the painting operation, an uneven painting, so called a scaffold unevenness, is produced in connection with a scaffold to produce a problem of beauty and further not only an uneven shade of paint film occurs but also a problem occurs in water-proofness.

In view of such a state, the present inventors have found from their repeated various kinds of investigation that the water-proofness can be given to the porous outer wall without producing the above described problems by bonding or sticking a sheet having the water-proofness suitable for the exterior prefabricated in the factory without utilizing a painting means which is used in the construction site for giving the water-proofness to the porous outer wall. And, a water-proof ornamental sheet obtained by applying a water-proof paint on a surface of a fibrous member and impregnating the water-proof paint to form a water-proof layer and subsequently, sticking an ornamental resin paint to the resulting water-proof layer has been already proposed in Japanese Patent Laid-Open No. Sho 61-15135. In addition, also a method of giving a water-proofness used in the manufacture of the water-proof ornamental sheet has been proposed.

However, also as to a water-proof ornamental sheet proposed by the present inventors, the fibrous member is not uniformly and effectively impregnated with a water elastic paint according to characteristics of the fibrous member used, whereby the water-proof effect partially becomes incomplete. In addition, it has been found that in the case where this water-proof ornamental sheet is stuck to an outer wall formed of a porous outer wall material such as an ALC plate with adhesives, the inter-layer separation occurs between said water-proof ornamental sheet and the adhesive layer according to characteristics of the fibrous member, whereby the water-proof effect can not be sufficiently achieved which is a technical problem to be solved.

So, the appearance of an ornamental sheet used for giving a novel water-proofness, from which the above described technical disadvantages were eliminated, in order to giving a water-proofness, weather-proofness and contamination-proofness without any practical problem by applying to an outer wall formed of porous wall materials, such as light weight concrete, which are remarkably useful, has been expected.

BRIEF DESCRIPTION OF THE INVENTION

The present inventors found from their earnest investigation in view of the above described state that unit quantity, permeability and the like of a fibrous sheet member used are strongly related to the appearance of an incompleteness of a partial water-proof effect, which seems to result from said uneven impregnation, appearance of said inter-layer separation phenomenon and the like and could obtain an exterior water-proof ornamental sheet capable of not only preventing the appearance of the incomplete water-proof effect but also preventing the inter-layer separation phenomenon by suitably selecting said premeability and the like and overcame said conventional technical problems, whereby effectively giving a water-proofness to an outer wall formed of a porous wall material.

That is to say, the present invention relates most basically to an exterior water-proof ornamental sheet comprising a fibrous sheet member, ornamental layer and intermediate water-proof layer, a part of said water-proof layer being a water-proof paint-impregnated portion formed by impregnating said fibrous sheet member with a water-proof paint. The water-proof paint-impregnated portion can still further improve an effect obtained by the present invention due to that formed with leaving a water-proof paint-not impregnated portion on a part of the fibrous sheet member.

And, in order to improve the weather-resistance and contamination-resistance in addition to the water-proofness, also a laminate comprising said exterior water-proof ornamental sheet and a top coat paint film layer formed of acrylic resin paints, setting fluorine resin paints or acryl silicone resin paints on the ornamental layer of the exterior water-proof ornamental sheet has been developed.

This exterior water-proof ornamental sheet can maintain a suitable bonding state producing no interlayer separation between the water-proof ornamental sheet and the adhesive layer by sticking it to an outer wall surface without substantially leaving any adhesive-not impregnated portion in the water-proof paint-not impregnated portion. The suitable bonding state to the outer wall surface can be maintained in the same manner as in the above described case using adhesives also by sticking to the outer wall surface through an adhesive water-proof rubber sheet without usign adhesives.

DETAILED DESCRIPTION OF THE INVENTION

Figure 1:
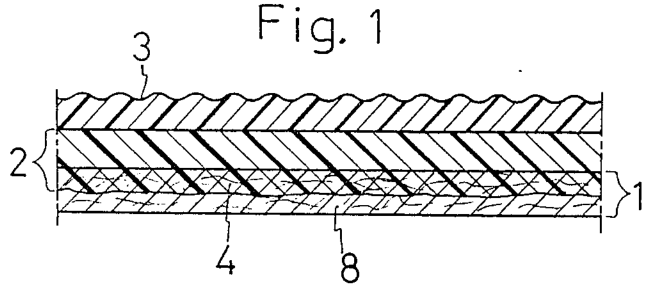
FIG. 1 is a longitudinal sectional view showing an exterior water-proof ornamental sheet superior in water-proofness according to the present invention.

A fibrous sheet member according to the present invention is a sheet-like article formed of inorganic fibers, such as ceramic fibers and glass fibers, or organic fibers, such as vinylone fibers, acrylic fibers, polyester fibers, polyvinyl chloride fibers and acetate fibers, in particular the sheet-like article obtained in the form of paper, woven fabric and nonwoven fabric is suitably used.

The unit quantity of these sheet-like articles is selected at 10 to 100 $g/m^2$, preferably 40 to 60 $g/m^2$. In a range of this unit quantity of 10 $g/m^2$ or less, since a fiber density is too small, a strength of the obtained water-proof ornamental sheet is practically insufficient while in a range of the unit quantity of 100 $g/m^2$ or more, since the fiber density is too large and an even impregnation with water elastic paints can not be expected, a water-proofness of the obtained water-proof ornamental sheet is incomplete, whereby the effects of the present invention are not attained.

In addition, in order to attain the effects of the present invention, it is necessary to meet the condition that a value of a permeability of said fibrous sheet conforming to JIS P 8117 is 1 second or less even though said unit quantity is within a suitable range of 10 to 100 $g/m^2$. If the permeability exceeds 1 second, the even impregnation with water-proof paints can not be attained, whereby the water-proofness of this water-proof ornamental sheet becomes incomplete which is not preferable. If the permeability is 1 second or less as far as the unit quantity is 10 $g/m^2$ or more, the effects of the present invention can be given to the water-proof ornamental sheet.

Water-proof paints are used for the formation of a water-proof layer (2) used in the present invention. Every water-proof paint capable of giving an elasticity adn a water-proofness to a paint film is suitably used. This water-proof paint includes emulsions such as acrylic emulsion, acryl/styrene emulsion, acryl/vinyl acetate emulsion and ethylene/vinyl acetate emulsion. Of them, acrylic emulsions are more suitably used.

Said water-proof paint is obtained by adding inorgaic pigments or fillers, such as titanium oxide and calcium carbonate, to these emulsions and its viscosity is generally adjusted at for example 3,000 to 10,000 cps.

Textured coating patterns and multi-color coating patterns are given on a surface of the water-proof layer (2) by spraying these paint on the water-proof layer (2).

The textured coating pattern concretely includes a tile like coating pattern, citron skin coating pattern, spatter coating pattern, crater coating pattern, stucco coating pattern, stipple coating pattern and the like.

In particular, the spatter coating pattern and tile like coating pattern are suitable.

A top coat paint film layer-forming paint laminated on a surface of an ornamental layer (3) in order to protect the surface of the ornamental layer (3) of the sheet-like article having a surface ornamental property, give a contamination-resistance and improve a weather-resistance is usually acrylic resin paints. In addition, setting type fluorine resin paints or acryl/silicon resin paints superior in weather-resistance can be suitably used. The exterior water-proof ornamental sheet superior in weather-resistance and contamination-resistance according to the present invention can not be obtained until said paints are coated on said ornamental layer (3).

Said-setting type fluorine resin for use in paint includes for example LUMIFLON (solvent-soluble and room temperature-setting type fluorine resin for use in paint) manufactured by Asahi Glass Co., Ltd. Japan. Xylene series of solvent are used and usually a viscosity of 4,000 to 5,000 cps. at a solid content of 50 to 60% by weight is selected. In addition, an ultra-weather-resisting fluorine resin paint obtained by using said LUMIFLON manufactured by Asahi Glass Co., Ltd. Japan as the resin for use in paint includes BONFLON manufactured by BONTILE Co., New Garmet #5000 manufactured by Toa Paint Co. Japan, Ltd. manufactured by Suzuka Paint., Ltd. and the like, and they are all suitably used.

The paint for forming a top coat paint film (9), which can be suitably used as the top coat layer to give the effects of the present inveniton in the manufacture of a water-proof ornamental sheet according to the present invention, further includes acryl/silicon resin solvent type paints. For example, KANEKA GEMLAC manufactured by Kanegafuchi Chemical Industries Co., Ltd. Japan is used. This is a siloxane cross-linking type reactive polymer comprising alcoxysilyl groups bonded to a main chain and reacted with an infinitesimal amount of water in an air to be set, whereby suitably forming the highly weather-resisting and contamination-resisting top coat paint film layer (9), that is, said effects of the present invention can be given.

When paints obtained by adding metallic powders, such as aluminum powders, copper powders and stainless steel powders, to the above described acrylic resin paint, setting type fluorine resin paint or acryl/silicon resin paint are coated on said ornamental layer (3) to form a metallic powder-contained metallic paint film layer and this is used as said top coat paint film layer (9), said exterior water-proof ornamental sheet having an ornamental effect due to a designal property given in addition to the weather-resistance and contamination-resistance is obtained, which is more suitable. In addition, when paints obtained by adding pearl pigments, such as mica powders, to these paints are coated on said ornamental layer (3) to form a minearl powder-contained paint film layer and this is used as said top coat paint film layer (9), the designal property can be given in addition to the contamination-resistance and weather-resistance in the same manner as the case where the above described metallic powder-contained paint film layer was formed, whereby also the ornamental effect can be given, which is much more suitable.

As above described, in the case where the top coat layer (9) is used as the metallic powder-contained metallic paint film layer, metallic powders existing on the paint film surface have a thin coat layer on a surface of powders and show a discoloration due to an oxidation and the like by an air for a long time according to circumstances. Accordingly, it is still preferable that a paint film formed of acrylic resin-, setting type fluorine resin- or acryl/silicon resin solvent type paints without containing metallic powders is additionally laminated on said metallic powder-contained metallic paint film layer.

In the manufacture of an exterior water-proof ornamental sheet according to the present invention, it is preferable that as shown in FIG. 1, said water-proof paint for forming the water-proof layer (2) is applied on the surface of the fibrous sheet member (1) having said and permeability and a cross section of the sheet member (1) is impregnated with said waterproof paint to form the water-proof-impregnated portion (4) and then an ornamental paint is appleid on a surface of the water-proof layer (2) to laminatedly form the ornamental layer (3) having an uneven pattern and the like. In this case, as above described, it leads to an improvement of adhesion and the prevention of adhesion of sheet members to each other during storage that the paint is coated and impregnated so that the water-proof paint-not impregnated portion (8) may exist on one surface of the fibrous sheet member (1) or an inside adjacent to said surface, as above described, which is preferable.

Methods using a roll coater, spray, flow coater, doctor knife and the like can be suitably used as a method of coating, laminating and forming the water-proof layer (2) and the ornamental layer (3) and a method of forming the top coat paint film layer.

The exterior water-proof ornamental sheet according to the present invention is stuck to the outer wall surface (7) formed of porous wall materials, such as light weight concrete plate, through the adhesive layer (6). In this time, in view of the prevention of the inter-layer separation between the adhesive layer (6) and this water-proof ornamental sheet, the existence of the water-proof paint-not impregnated portion (8) in the sheet member, so that one surface of the ornamental sheet may not be impregnated with said water-proof paint but a surface of this ornamental sheet or an inside adjacent to said surface may be impregnated with adhesives, as above described, makes a product of the present invention more useful. In said surface or the vicinity thereof, the water-proof paint-not impregnated portion (8) in FIG. 1 is impregnated with adhesives to form the adhesive-impregnated portion (5) and fibers are surrounded with adhesives to form a part of the adhesive layer (6), whereby said interlayer separation can be more surely prevented.

In addition, if this paint is impregnated so that the water-proof paint-not impregnated portion (8) may exist on one surface of the fibrous sheet member or the inside adjacent to said surface, this paint having an adhesive property does not reach the surface, so that the hindrance against an operation due to the adhesive property of the surface in the winding-up operation of the exterior water-proof ornamental sheet product can be avoided and it is remarkably suitable also in respect of storage.

A method of constructing an exterior water-proof ornamental sheet using ahdesives proposed by the present invention and above described is characterized by that the exterior water-proof ornamental sheet is stuck to the outer wall surface (7) so that the water-proof paint-not impregnated portion (8) may be sufficiently impregnated with adhesives and an adhesive-not impregnated portion may substantially not exist in said water-proof paint-not impregnated portion (8). A quantity of adhesives applied on the surface of said water-proof paint-not impregnated portion (8) is dependent upon a thickness of the fibrous sheet member (1), a share of the water-proof paint-not impregnated portion (8) in the direction of this width but 100 to 150 $g/m^2$, preferably 200 to 400 $g/m^2$, is required.

In view of the strength, uniform and sure impregnation with paints and adhesives and the like, the unit quantity of 10 to 100 $g/m^2$, preferably 40 to 60 $g/m^2$, is given to the fibrous sheet member (1). Also the permeability of 1 second or less is a condition that the product is suitably used. Thus, in the method of constructing according to the present invention, adhesives are more easily impregnated with the water-proof paint-not impregnated portion (8), whereby the effects of the present invention can be satisfactorily given.

A thickness of the fibrous sheet member (1) is selected at 0.03 to 1.00 mm, preferably 0.05 to 0.30 mm. In the formation of the water-proof paint-impregnated portion (4) of this fibrous sheet member (1), it is necessary to leave the water-proof paint-not impregnated portion (8) over 30 to 70% in the direction of thickness. If the share of the water-proof paint-not impregnated portion (8) is less than 30%, fibers are surrounded with adhesives, whereby the effect of improving the bond strength can be first expected but it is insufficient, in particular the bond strength when containing water is unsatisfactory while if the share of the water-proof paint-not impregnated portion (8) exceeds 70%, this water-proof paint-not impregnated portion (8) is not always completely impregnated with adhesives according to circumstances and as a result, the bonding, in particular the bonding when containing water, becomes unsatisfactory, whereby producing phenomena such as swelling and separation, which is not desirable.

Although an optimum quantity of adhesives applied is dependent upon a degree of compactness (degree of porosity and the like) of the outer wall surface (7) and various kinds of characteristic, thickness and the like of the water-proof paint-not impregnated portion (8) of the fibrous sheet member (1), if the quality of adhesives is less than 100 $g/m^2$, portions, which are not impregnated with adhesives, can not be substantially removed after the adhesives were applied on the water-proof paint-not impregnated portion (8). The use of the adhesives in a quantity exceeding 500 $g/m^2$ leads to not only an increase of a time required for the solidification and adherence due to the existence of unnecessarily excessive adhesives but also an inexpensiveness, which is not desirable.

This method of constructing an exterior water-proof ornamental sheet aims at the adherence of the water-proof ornamental sheet to the outer wall surface (7). The adhesives are preferably sufficiently water-proof in view of various point. The water-proof adhesives include acrylic resin adhesives and ethylen/vinyl acetate resin adhesives of water emulsion type. Solvent type adhesives include for example synthetic rubber adhesives such as chloroprene rubber and setting type adhesives include epoxy resin adhesives. Above all, acrylic resin adhesives of water emulsion type are preferable in view of the applicability in the construction site. These various kinds of adhesives may comprise powdery fillers, such as calcium carbonate powders, titanium oxide powders and aluminum hydroxide powders, if necessary.

The viscosity of the adhesives is selected at 1,000 to 10,000 cps., preferably 4,000 to 8,000 cps. If this viscosity amounts to a value exceeding 10,000 cps., the portions, which are not impregnated with the adhesives, in said water-proof paint-not impregnated portion (8) can not be substantially removed after the adherence was carried out. In addition, if the viscosity is less than 1,000 cps., the adherence can not be satisfactorily carried out.

Figure 3:
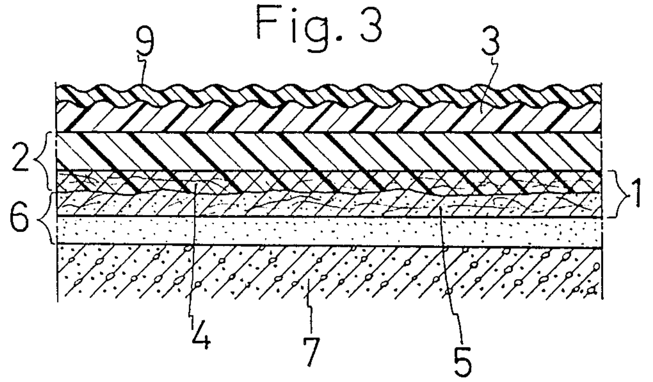
FIG. 3 is a longitudinal sectional view showing a state of sticking a sheet shown in FIG. 1 or FIG. 2 to an outer wall surface.

A sectional view showing the state after the exterior water-proof ornamental sheet was stuck to the outer wall surface according to the present invention is shown in FIG. 3. In addition, in the case of the porous outer wall, also the outer wall is impregnated with a part of the adhesives to make the bonding state more superior but portions of the outer wall impregnated with the adhesives in this case are not shown.

According to the present invention, the exterior water-proof ornamental sheet has the above described construction, so that the fibrous sheet member (1) is uniformly impregnated with water-proof paints, whereby defective portions making the water-proof effect partially incomplete due to the uneven impregnation can be completely prevented from generating. In addition, the bonding of the adhesive layer to this ornamental sheet can be improved by utilizing a part of said sheet member (1) as the water-proof paint-not impregnated portion (8), whereby the above described interlayer separation can be more surely prevented. In this case, the not-impregnated portion is impregnated with a part of the adhesives to form a part of the adhesive layer, whereby further ensuring the prevention of the generation of the inter-layer separation.

In addition, the exterior water-proof ornamental sheet according to the present invention uses the fibrous sheet member (1) as a substrate for use in the formation of the water-proof layer (2), so that the practically preferable strength can be attained. In addition, the exterior water-proof ornamental sheet according to the present invention meets JIS A 6910 5.10 (water-permeability test), JIS A 6910 5.12 (weather-resistance test) and JIS A 6910 5.13 (elongation test). In addition, an article obtained by adhering this water-proof ornamental sheet to a foundation, such as ALC plate, meets JIS A 6910 5.8 (bond strength test), JIS A 6910 5.9 (hot-cold repetition test) and JIS A 6910 5.11 (impact test) and has the performance nearly equal to that of an exterior paint prescribed in JIS A 6910.

In addition, an article comprising the outermost top coat paint film layer (9) formed of acrylic resin paints, setting type fluorine resin paints of acryl/silicon resin paints laminated on the ornamental layer (3) is particularly superior in weather-resistance and contamination-resistance.

In addition, with the constructing method according to the present invention, the water-proof paint-not impregnated portion (8) is impregnated with adhesives to form the adhesive-impregnated portion (5) and fibers are surrounded by the adhesives to form a part or whole of the adhesive layer (6), whereby the inter-layer separation between the adhesive layer (6) and the ornamental sheet can be surely prevented. In addition, the portions, which are not impregnated with the adhesives, are not left in the adhesive-impregnated portion (5) within the ornamental sheet and the uneven water-proofness and incomplete water-proofness incidental to the outer wall stuck to the ornamental sheet by the conventional method are not found, that is, the satisfactory water-proofness and water-resistance can be attained.

Figure 4:
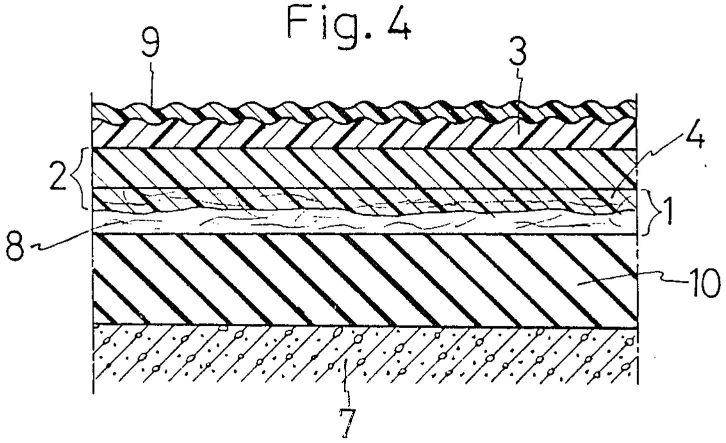
FIG. 4 is a longitudinal sectional view showing a state of sticking the sheet shown in FIG. 1 or FIG. 2 to the outer wall surface through an adhesive water-proof rubber sheet.

Furthermore, as to the constructing method of the exterior water-proof ornamental sheet according to the present invention, also a method of sticking the exterior water-proof ornamental sheet to the outer wall surface (7) through a adhesive water-proof rubber sheet is proposed in addition to said method of sticking the exterior waterproof ornamental sheet using the adhesives. With this constructing method, as shown in FIG. 4, the adhesive water-proof rubber sheet (10) is stuck to the water-proof paint-not impregnated portion (8) of a rear surface side of the ornamental sheet to integrate the adhesive water-proof rubber sheet (10) with the ornamental sheet and the resulting assembly is stuck to the outer wall surface (7) by the adhesive property of the adhesive water-proof rubber sheet (10). Since the adhesive water-proof rubber sheet is used, the sufficient water-proofness can be attained even though the water-proof paint-non impregnated portion (8) is left in the fibrous sheet member (1).

The adhesive water-proof rubber sheet (10) mainly comprising adhesive non-vulcanized rubber is used. This non-vulcanized rubber includes natural rubber or synthetic rubber compounds, such as butyl rubber, polybutadiene rubber and styrene-butadiene rubber, rubber-asphalt compounds formed of a mixture of reclaimed rubber, rubber and asphalt and the like.

In addition, a thickness of the adhesive waterproof rubber sheet (10) is not specially limited but selected at 0.3 to 2.0 mm, preferably 0.5 to 1.2 mm. In order to improve a shape-holding property of the adhesive water-proof rubber sheet (10), a net-like textile, such as cold silk gauze, is preferably laminated on the adhesive water-proof rubber sheet (10).

The exterior water-proof ornamental sheet and the method of manufacturing the same are below described in detail with reference to the preferred embodiments but the present invention is not limited to these preferred embodiments. In addition, "parts" is designated by weight.

EXAMPLE 1

A non-woven glass wool fabric having a unit quantity of 50 g/m$^2$, permeability of 0.5 seconds and thickness of 0.07 mm was coated with a water-proof paint having the following composition on one surface and an inside of the non-woven fabric was impregnated with the water-proof paint.

| | |
|---|---|
| acrylic resin emulation | 100 parts |
| titanium oxide | 10 parts |
| calcium carbonate | 90 parts |
| pigments | 0.8 parts |
| surfactants | 0.2 parts |
| viscosity | 3,000 to 4,000 cps. |

The coating and impregnation were carried out so that the portions, which were impregnated with the water-proof paint, may not reach the other surface of said non-woven fabric. Subsequently, the non-woven fabric was dried for 3 minutes in an air-heating drier using a hot air of 115° C.

Then, an ornamental paint having the following composition was applied on a surface of the dried nonwoven fabric by means of a roll coated followed by drying for 3 minutes in the air-heating drier of 115° C.

| | |
|---|---|
| styrene/acryl resin emulsion | 100 parts |
| titanium oxide | 10 parts |
| calcium carbonate | 50 parts |
| pigments | 0.8 parts |
| surfactants 0.2 | parts |
| plasticizers | 8 parts |
| viscosity | 3,500 to 4,500 cps. |

The obtained exterior water-proof ornamental sheet was a sheet having an uneven pattern on a surface thereof and a beautiful external appearance.

In addition, in the case where the drying time after coating and impregnating the water-proof paint is short, for example the drying time is 1 minute, the uneven pattern was slightly reduced but the performance as the exterior water-proof ornamental sheet was not taken in question at all.

The resulting sheet met JIS A 6910 5.10 (water permeability test), JIS A 6910 5.12 (weather-resistance test) and JIS A 6910 5.13 (elongation test). In addition, the adhesion of the right surface and the rear surface of this ornamental sheet was remarkably reduced. As a result, the winding-up operation was not taken in question at all.

The adhesives were applied on a rear surface of the exterior water-proof ornamental sheet obtained in the present preferred embodiment at a ratio of 150 g/m$^2$ and the adhesives were applied also on the ALC plate as the foundation at a ratio of 200 g/m$^2$ and subsequently, the ALC plate was stuck to the exterior water-proof ornamental sheet. The filler-contained acrylic resin adhesives were used as the adhesives. The ALC plate incorporated with the exterior water-proof ornamental sheet comprised said not-impregnated portion impregnated with the adhesives, whereby said inter-layer separation did not occur at all in the practical use.

This composite ALC plate met also JIS A 6910 5.8 (adhesion test), JIS A 6910 5.9 (hot-cold repetition test) and JIS A 6910 5.11 (impact test).

Also as to a composite slate plate, in which said adhesives were applied on the slate plate used as the foundation at a ratio of 150 g/m$^2$ and on said rear surface of the sheet as a ratio of 180 g/m$^2$ and subsequently, the sheet was stuck to the slate plate, similar results were obtained.

EXAMPLE 2

Next, the ornamental layer (3) of the sheet obtained in the above described Example 1 was subjected to an embossing treatment to form the ornamental layer having the uneven pattern on the surface thereof and a beautiful external appearance and a surface of the embossed ornamental layer (3) was coated with BONFLON #5000 clear (main agent/setting agent =3/1 by weight) manufactured by BONTILE Co. by means of a roll coater followed by setting for 30 minutes at 120° C. to form the top coat paint film layer (9). This top coat paint film layer (9) was about 25 microns thick.

Figure 2:
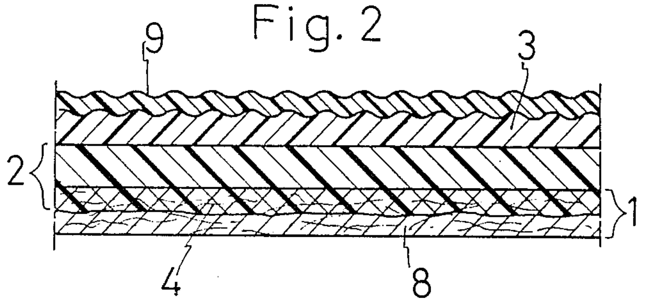
FIG. 2 is a longitudinal sectional view showing an exterior water-proof ornamental sheet superior in weather-resistance and contamination-resistance in addition to water-proofness.

The obtained exterior water-proof ornamental sheet as shown in FIG. 2 was remarkably superior in weather-resistance and contamination-resistance and met JIS A 6910 5.10 (water permeability test), JIS A 6910 5.12 (weather-resistance test) and JIS A 6910 5.13 (elongation test).

EXAMPLE 3

In order to adopt the constructing method using adhesives according to the present invention, that is, a method of sticking without substantially leaving any adhesive-not impreganted portion in the water-proof paint-not impregnated portion (8) of the ornamental sheet, for the exterior water-proof ornamental sheet obtained in the present invention, adhesives having the following composition were uniformly applied to a rear surface of the sheet by means of a roller coater at a ratio of 300 g/m$^2$ and then the sheet was stuck to a precast concrete plate (PC plate) as the foundation (7) of the outer wall surface followed by drying for 14 days under the conditions that a temperature is 20° C. and a humidity is 65%.

| | |
|---|---|
| acrylic emulsion | 100 parts |
| calcium carbonate | 100 parts |
| tackyfier | 0.3 parts |
| additives | 0.8 parts |
| viscosity | 6,000 cps. |

After drying, this ornamental sheet-stuck PC plate was tested in accordance with JIS A 6910 5.8 (adhesion test). A value of 12.5 kgf/cm$^2$ was obtained.

As shown in FIG. 3, the PC plate, in which the exterior water-proof ornamental sheet is incorporated, is formed as the adhesive-impregnated portion (5) obtained by impregnating said not impregnated portion (8) with adhesives. Accorindingly, said inter-layer separation was not brought about at all in the practical use. The PC plate, in which this exterior water-proof ornamental sheet was incorporated, was remarkably superior in weather-resistance and contamination-resistance. In addition, also the contamination adhered during the use for a comparatively long time could be easily swept off.

In order to more surely grasping a state within a cross section of the above described water-proof ornamental sheet-stuck PC plate, the adhesives were tinged with red separately under the same conditions and dried similarly. Subsequently, the cross section was examined with a result that no not impregnated portion was found in the adhesive-impregnated portion of the non-woven fabric.

The PC plate provided with the above described exterior ornamental sheet as a surface was remarkably superior in water-proofness and water-resistance and no dispersion and the like of water-proofness and water-resistance, which are substantially taken in question when the exterior water-proof ornamental sheet is used between the PC plates obtained by the construction method according to the present invention, were found.

In addition, in another test, the exterior water-proof ornamental sheet-stuck PC plate was obtained in the same manner as in the above described Example excepting that adhesives having the following composition were used and the adhesives were applied on a rear surface of said ornamental sheet at a ratio of 200 g/m$^2$.

| | |
|---|---|
| acrylic emulsion | 100 parts |
| tackyfier | 0.8 parts |
| viscosity | 4,500 cps. |

The obtained exterior water-proof ornamental sheet-stuck PC plate was separately examined on the cross section under the same conditions in the same manner as in said Example with a result that the bonding portions of the non-woven fabric were impregnated with the adhesives all over the surface thereof and no impregnated portion was found. In the test complying with JIS A 6910 5.8 (adhesion test) a value of 11.0 kgf/cm$^2$ was obtained.

In still another test, the exterior water-proof ornamental sheet-stuck PC plate was obtained in the same manner as in the above described example excepting that a light weight foamed concrete plate (ALC plate) was used in place of the above described PC plate and the adhesives were applied on said rear surface of the ornamental sheet at a ratio of 495 g/m$^2$.

No adhesive-not impregnated portion was found in a cross section in the same manner as in the above described example. The adhesion test was carried out in compliance with JIS A 6910 5.8 with the destruction of ALC plate and a value of 6.5 kg/cm$^2$. And, said adhesion test was carried out with changing only the quantity of adhesives applied on the rear surface of the ornamental sheet to 420 g/m$^2$ with a result that a value of 7.0 kgf/cm$^2$ was obtained and the ALC plate was destructed.

EXAMPLE 4

In order to put a method of constructing the exterior water-proof ornamental sheet obtained in said Examples according to the present invention, that is, a method of sticking the exterior water-proof ornamental sheet to the outer wall surface (7) through the adhesive water-proof rubber sheet, into practice, the adhesive water-proof rubber sheet (10) formed of butyl rubber and having a thickness of about 0.7 mm and a construction that a cold silk gauze is stuck to the rear surface in a reinforced manner and a releasable paper is stuck to the cold silk gauze manufactured by Sekaicho Co., Ltd. Japan was stuck to the ALC plate as the outer wall surface (7). This bonding state is shown in FIG. 4. Although the water-proof paint-non impregnated portion (8) was left, the objects of the present invention could be sufficiently achieved in the same manner as in said Example 3 on account of the superiority of the rubber sheet (10) in adhesion and water-proofness.

What is claimed is:

1. An exterior water-proof ornamental sheet comprising:

a fibrous sheet member which is a non-woven fabric having a unit quantity of 10 to 100 g/m$^2$, a thickness of 0.03–1 mm and an permeability of 1 second or less;

an ornamental layer; and an intermediate water-proof layer in which a part of said water-proof layer is a water-proof paint-impregnated portion formed by impregnating 30–70% of a thickness of said fibrous sheet member with water-proof paints.

2. An exterior water-proof ornamental sheet is set forth in claim 1, in which a top coat paint film layer formed of acrylic resin paint, setting type fluorine resin paints or acryl/silicon resin paints is laminated on said ornamental layer having a surface ornamental property.

3. An external water-proof ornamental sheet as set forth in claim 2, in which said top coat paint film layer is formed of acrylic resin paints, setting type fluorine resin paints of acryl/silicon resin paints with metallic or mineral powders added.

4. An exterior water-proof ornamental sheet as set forth in claim 2 or 13, in which said top coat paint film layer is a composite top coat paint film layer comprising a first paint film layer formed of acrylic resin paints, setting type fluorine resin paints or acryl/silicon resin paints and a second paint film layer formed of said paints with metallic powders added in which said second paint film layer is laminated on said first paint film layer, said first paint film layer being an outer layer.

5. A method of manufacturing an exterior waterproof ornamental sheet comprising the steps of:

impregnating a fibrous sheet member with a water-proof paint such that over 30 to 70% of said fibrous sheet in a direction of thickness of said fibrous sheet is not impregnated to form an intermediate water-proof layer on one side of said fibrous sheet member, said fibrous sheet member having a unit quantity of 10 to 100 g/m$^2$, a thickness of 0.03 to 1.0 mm and a permeability of 1 sec. or less; and providing an ornamental layer on said intermediate waterproof layer.

6. A method according to claim 5 further comprising providing a layer of adhesive of unit quantity 100 to 500 g/m$^2$ and a viscosity of 1000 to 10,000 cps on an other side of said fibrous sheet member which is not paint impregnated.

* * * * *